L. Stadler.
Corn Harvester.
No. 94,662.  Patented Sep. 7, 1869.
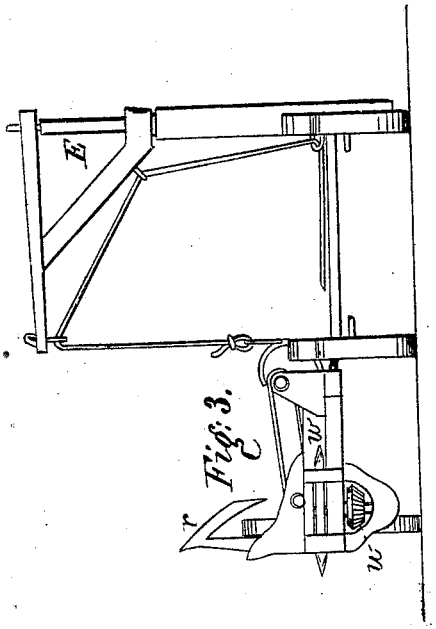
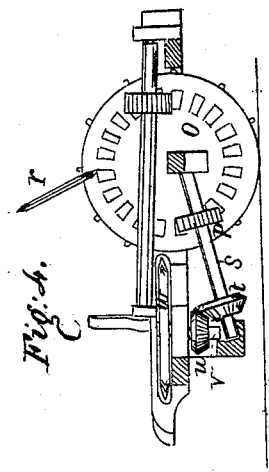
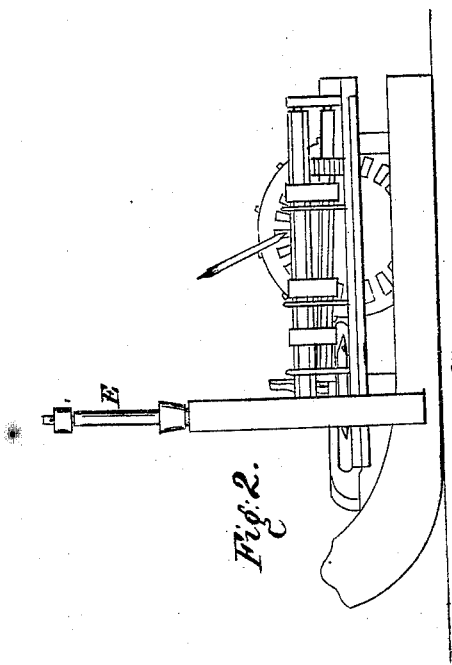
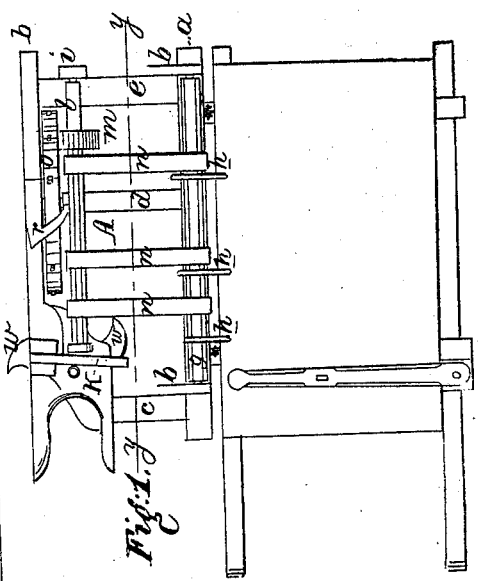
Witnesses
A. C. Smith
Inventor
Lucas Stadler
Chipman Hosmer & Co.
attys.

United States Patent Office.

LUCAS STADLER, OF BOWENSBURG, ILLINOIS.

Letters Patent No. 94,662, dated September 7, 1869.

IMPROVEMENT IN CORN-HARVESTERS.

The Schedule referred to in these Letters Patent and making part of the same.

*To all whom it may concern:*

Be it known that I, LUCAS STADLER, of Bowensburg, in the county of Hancock, and State of Illinois, have invented a new and valuable Improvement in Corn-Cutters; and I do hereby declare that the following is a full, clear, and exact description of the construction and operation of the same, reference being had to the annexed drawings, making a part of this specification, and to the letters and figures of reference marked thereon.

Figure 1, of the drawings, is a plan view of my device;

Figure 2 is a side view;

Figure 3 is an end view; and

Figure 4 is a sectional view on the line $y\ y$ of fig. 1

The nature of my invention consists in providing means for cutting standing corn-stalks near their roots, conveying them to and upon a convenient platform, binding them into bundles there, and hoisting them from thence to the ground.

The letter A of the drawings, represents a frame, having side-pieces $a$ and $b$, and cross-bars $c$, $d$, and $e$.

The letters $f$ are upright arms adjusted on side-piece $a$, near the upper ends of which I adjust the roller $g$.

Letter $h$ represents a series of hooks, arranged in side-piece $a$, and passing over the roller $g$ in such manner as to form aids in conducting the corn-stalks to the platform, as hereinafter mentioned.

Letters $i$ and $k$ are arms, adjusted in the manner and at the points indicated, in which I arrange the roller $l$, as shown.

Letter $m$ is a pinion attached to said roller $l$, and letters $n$ are belts passing over and around rollers $g$ and $l$, respectively. I usually place small spikes in these belts, to aid in conveying the corn-stalks toward the platform.

Letter $o$ is a large wheel adjusted on the inner side of side-piece $b$, as shown.

It has a series of spikes or pins on its rim, and also a series of cogs on its inner side, below the rim, adapted to mesh and work with the cogs of pinion $m$ and the pinion $p$, hereinafter mentioned.

Letter $r$ is a hook, adjusted in the top of side-piece $b$, and passing over the wheel $o$. This hook serves as a means of guiding the corn-stalks to the belts.

The letter $s$ is a pinion-shaft, adjusted in the manner shown on fig. 4, upon which I arrange the pinion $p$, and the bevelled pinion $t$, as represented on said figure.

The letter $u$ is a bevelled pinion, attached to the upright shaft $v$, as shown, and working with bevelled pinion $t$ on the shaft $s$.

The letters $w$ are a series of knives, adjusted upon the shaft $v$. They rotate with said shaft in a large opening or slot formed in the side-piece $b$, as shown, and are the immediate means by which the corn-stalks are cut. For the purpose of clasping the hills of standing stalks, and guiding them to the knives $w$, I construct the forward end of side-piece $b$, in the form of open jaws, as shown on fig 1.

The arm $k$ serves, in conjunction with the hook $r$, as a guide to the corn-stalks in conveying them to the belts.

The foregoing constitute the main features of my device for cutting the corn-stalks and conveying them to the platform. I usually attach it to the side of a sled, as shown on fig. 1, the bottom of which serves for the platform. I may also attach this device to a carriage having small wheels.

It will readily be perceived, that as the sled moves forward, the wheel $o$, in turning over upon the ground, rotates the pinions $p$ and $t$, and consequently the knives $w$. The standing stalks are gathered into the jaws of side-piece $b$, and are cut off by said knives. When thus cut, the stalks fall backward, and are guided by the arm $k$ and hook $r$ upon the belts, which, moving at the same time upon their rollers, carry the corn-stalks upon the platform with the tops all one way.

To form the corn-stalks into bundles and remove them from the platform, I adjust a derrick on the opposite side of the platform, as represented at E. I also attach a cord to said derrick, in the manner shown on fig. 3, to one end of which cord I attach a hook, as represented. When the corn-stalks are being cut and conveyed to the platform, I lay the hook-end of the cord upon the platform in such manner that the stalks shall fall thereon, and when a sufficiently large bundle is made, I clasp the hook around the cord above the corn-stalks, and by means of the derrick, lift the bundle thus formed from the platform and deposit it upon the ground.

What I claim as my invention, and desire to secure by Letters Patent, is—

1. The combination and arrangement of the wheel $o$, shafts $s$ and $v$, pinions $m$, $t$, and $u$, hook $r$, arm $k$, knives $w$, rollers $g$ and $l$, and belts $n$, constructed and operating substantially as and for the purposes specified.

2. A corn-stalk cutter, having wheel $o$, shafts $s$ and $v$, pinions $m$, $t$, and $u$, hook $r$, rollers $g$ and $l$, and belts $n$, in combination with the derrick E, and cord and hook therewith connected, all constructed, arranged, and operating substantially as specified.

In testimony that I claim the above, I have hereunto subscribed my name, in the presence of two witnesses.

LUCAS STADLER.

Witnesses:
M. R. BUTZ,
L. E. EMMONS.